No. 834,307. PATENTED OCT. 30, 1906.
F. M. LANDON.
FISH HOOK.
APPLICATION FILED AUG. 15, 1905.
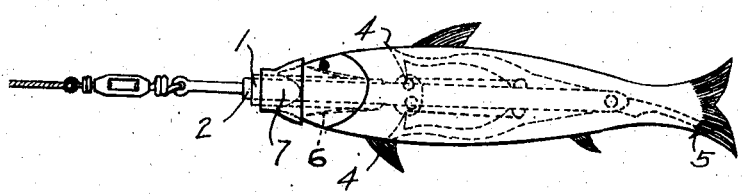
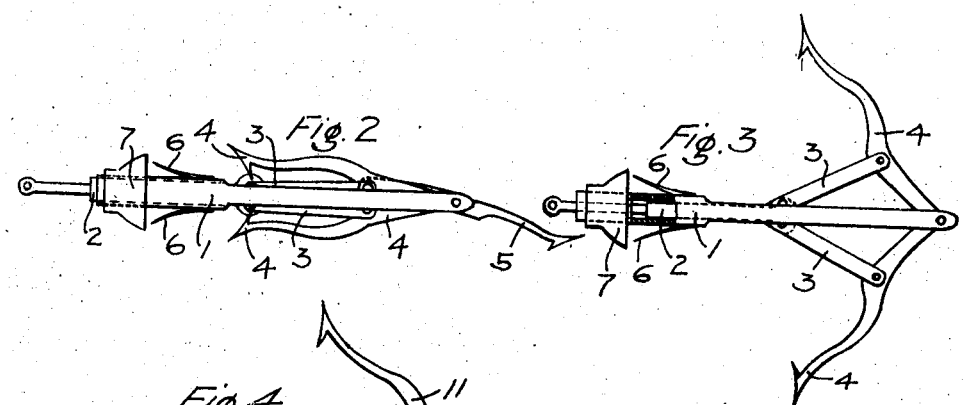
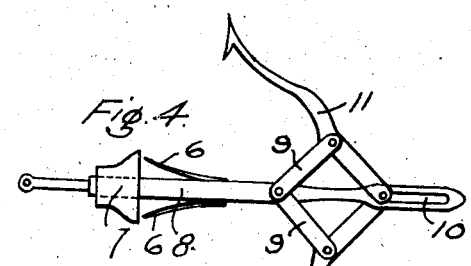
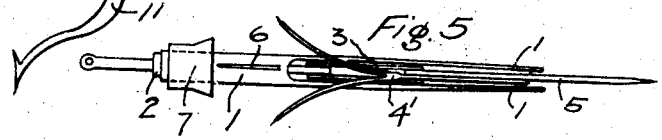
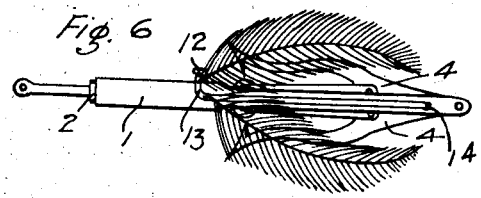
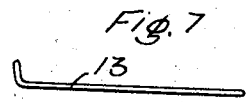
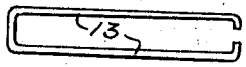
Witnesses
M. A. Van House
Paul V. Tuttle
Inventor
Frederick M. Landon
By R. J. Elliott
Attorney
THE NORRIS PETERS CO., WASHINGTON, D. C.

UNITED STATES PATENT OFFICE.

FREDERICK M. LANDON, OF TACOMA, WASHINGTON.

FISH-HOOK.

No. 834,307.  Specification of Letters Patent.  Patented Oct. 30, 1906.

Application filed August 15, 1905. Serial No. 274,297.

*To all whom it may concern:*

Be it known that I, FREDERICK M. LANDON, a citizen of the United States of America, residing at Tacoma, in the county of Pierce and State of Washington, have invented certain new and useful Improvements in Fish-Hooks, of which the following is a specification, reference being had therein to the accompanying drawings.

This invention relates to improvements in fish-hooks, and has for its objects to improve the devices for securing the bait to the hook, to improve the devices for securing interchangeable artificial flies to the hook, and to improve the devices for holding the caught fish on the hook.

I attain these objects by the devices and mechanism illustrated in the accompanying drawings, in which—

Figure 1 is a side view showing the hook baited with herring or other fish, and Fig. 2 is a similar view showing the hook unbaited. Fig. 3 shows a modified form of the hook in its extended position, being constructed without any throat-barb. Fig. 4 is another modified form in which the sliding frame of the hook has been replaced by a sliding pivot. Fig. 5 is a top view of a modified form in which one of the hooks is double-headed. Fig. 6 is a further modification constructed similarly to the form shown in Fig. 3 but provided with means for holding an artificial fly. Figs. 7 and 8 are respectively side view and plan of the fly-frame, the feathers thereof having been removed.

Similar numerals of reference refer to similar parts throughout the several views.

This hook consists of a frame to which are attached by pivots and links one or more barbed pieces in such manner that when the fish is hooked the resistance which it makes to the pull of the line will open out the pivoted barbs, thus cutting through the upper and lower jaws and also forcing and holding the mouth open and drowning the fish. It is intended that there shall be at least two barbed pieces to each hook; but the number may be increased, if desired.

In Figs. 1 and 2 are shown two main barbed pieces and one throat-barb.

In Fig. 5 the upper barbed piece is shown with two heads or barbs.

The frame consists of a tube 1, which is cut on two sides for most of the length thereof, so as to form the tines of a fork. Within the uncut portion of the tube slides the rod 2, which is attached at its outer end to the fishing-line and at its inner end to the front ends of the two connecting-links 3. The barbed pieces 4 are pivoted at the inner end to the end of the frame 1, being placed between the tines thereof, and are also connected to the other end of the links 3. If a throat-barb 5 is used, it is connected in the same way as the main barbs 4, but has its end extending away from the line. The double-headed barbed hook 4' (shown in Fig. 5) may be used instead of one of the barbed hooks 4, thus piercing the fish's jaw in two places.

Secured to the frame 1 are a pair of spring bait-holders 6, adapted to keep the herring or other fish used as bait from sliding off the hook. A shield 7 is placed adjacent to the spring-holders 6 and is adapted to be slid over the mouth of the bait-fish to prevent the water from entering it and splitting the bait away from the hook. The throat-barb 5 when used with fish for bait acts as a threader for the bait.

Referring to Fig. 1 it will be seen that the main hook is entirely concealed within the bait-fish and that when a larger fish chases the bait from the rear and grasps it he at once slackens his speed, and this action causes the barbed ends of the pieces 4 to travel outward, thus piercing his jaws and holding his mouth open. Further, since he will immediately pull back the action is increased, and the harder he pulls the wider his jaws will be forced open.

The variation shown in Fig. 4 consists of a bar 8, attached to the fishing-line and having the links 9 pivoted to it at a point intermediate of its length. The bar 8 has a slot 10 at its extremity. The barbed pieces 11 slide in the slot 10 and are also pivoted to the connecting-links 9. The action of the hook is the same as that in the other figures, the construction being different only in the substitution of the slot 10 for the tubular frame 1. The slotted end of the bar 8 acts as a threader in this form.

In cases where my hook is used for fly-fishing I provide a small hooked lug 12 on the upper part of the frame 1 and a pair of holes 14 near the ends of the tines of the frame. Under this lug 12 I fasten the frame 13, (shown in Figs. 7 and 8,) the ends of which are turned inward and enter the above-mentioned holes. To this frame 13 may be secured any artificial fly that is desired, the barbed pieces 4 being secreted among the feathers of the fly.

Having described my invention, what I claim is—

1. In a fish-hook, the combination with a bar attached to a fish-line, of a sliding frame thereon, barbed hook-pieces pivoted to said sliding frame, and connecting-links joining said barbed hook-pieces to said bar.

2. In a fish-hook, the combination with a bar attached to a fish-line, of a sliding frame thereon, barbed hook-pieces pivotally secured thereto and adapted to be concealed by bait, means for limiting the motion of said hook-pieces on their pivot, and a shield adapted to close over the mouth of the bait to prevent the entrance of water therein.

3. In a fish-hook, the combination with a bar attached to a fish-line, of a sliding frame thereon, barbed hook-pieces pivotally secured thereto and adapted to be concealed by bait, means for holding the bait in place, means for limiting the motion of said hook-pieces on their pivot, and a shield adapted to close over the end of the bait to prevent the entrance of water therein.

4. In a fish-hook, the combination with a bar attached to a fish-line, of a pivot slidably mounted thereon, barbed hook-pieces mounted on said sliding pivot, and connecting-links joining said barbed pieces to said bar.

In testimony whereof I affix my signature in presence of two witnesses.

FREDERICK M. LANDON.

Witnesses:
H. G. ROWLAND,
WALTER CHRISTIAN.